(12) United States Patent
Thurlow

(10) Patent No.: US 9,157,506 B2
(45) Date of Patent: Oct. 13, 2015

(54) FUSIBLE LINK

(71) Applicant: NCVW Management Group, LLC, Bay City, MI (US)

(72) Inventor: Greg Thurlow, Saginaw, MI (US)

(73) Assignee: NCVW Management Group, LLC, Bay City, MI (US)

(*) Notice: Subject to any disclaimer, the term of this patent is extended or adjusted under 35 U.S.C. 154(b) by 0 days.

(21) Appl. No.: 14/526,078

(22) Filed: Oct. 28, 2014

(65) Prior Publication Data
US 2015/0040533 A1  Feb. 12, 2015

Related U.S. Application Data

(62) Division of application No. 13/106,655, filed on May 12, 2011, now Pat. No. 8,869,500.

(51) Int. Cl.
*F16G 15/12* (2006.01)
*F16G 15/04* (2006.01)
*B21L 11/00* (2006.01)

(52) U.S. Cl.
CPC ............... *F16G 15/12* (2013.01); *B21L 11/00* (2013.01); *F16G 15/04* (2013.01); *Y10T 16/22* (2015.01); *Y10T 24/3902* (2015.01); *Y10T 24/45461* (2015.01); *Y10T 29/49829* (2015.01); *Y10T 29/49908* (2015.01); *Y10T 403/21* (2015.01)

(58) Field of Classification Search
CPC .................................. F16G 15/12; B21L 11/00
USPC .................................................... 59/78, 85, 93
See application file for complete search history.

(56) References Cited

U.S. PATENT DOCUMENTS

| 3,779,004 | A | 12/1973 | Gloeckler |
| 4,346,554 | A | 8/1982 | Glinecke |
| 4,796,420 | A | 1/1989 | Gueli |
| 5,120,152 | A | 6/1992 | Gueli |
| 8,869,500 | B2 * | 10/2014 | Thurlow ........................ 59/85 |

OTHER PUBLICATIONS

Non-Final Office Action dated Mar. 20, 2014, relating to U.S. Appl. No. 13/106,655.

* cited by examiner

*Primary Examiner* — David B Jones

(57) ABSTRACT

A fusible link is described comprising a first member selectively coupled to a second member via a connection member. The connection member is retained by way of first and second stop members that are defined in the second member and bear against the connection member and the first member.

15 Claims, 2 Drawing Sheets

FUSIBLE LINK

TECHNICAL FIELD

The disclosure relates to a fusible link that selectively separates based on a condition experienced by the fusible link.

DESCRIPTION OF THE RELATED ART

Fusible links have traditionally been used as a triggering devices in sprinkler systems and other release mechanisms. Prior art fusible links, such as the one described in U.S. Pat. No. 4,346,554 have relied on a traditional chain link to retain a strut between members and prevent its unpurposed removal.

SUMMARY

A fusible link is described that comprises a first member having a first portion and a second portion, the second portion having an attachment feature defining an opening having opposing top and bottom edges that are connected by first and second lateral edges; a second member having a portion that extends through the opening of the first member; a connection member having a first side and a second side, the connection member removably coupling the first member to the second member based on a condition experienced by a thermally responsive material disposed within connection member; a first stop member arranged on a first planar surface of the second member and bearing against the first side of the connection member; and second stop member arranged on a second planar surface of the second member and bearing against the first member just beneath the bottom edge of the opening, such that when the link is assembled, first stop member and second stop member generally restrict lateral movement of connection member until the thermally responsive material exceeds a threshold temperature.

A method for manufacturing a fusible link is described that comprises providing a first member having a first portion and a second portion, the second portion having an attachment feature defining an opening with opposing top and bottom edges that are connected by first and second lateral edges; providing a second member having a stop member; providing a connection member having a retention post and a base with a first side and a second side, co-locating the first member and the second member in a fixed position so that a portion of second member can be advanced through the opening of the first member; placing the connection member into the opening of the first member so that an axis of the retention post is generally parallel with an axis of the second portion of the first member; arranging the connection member so that the second end of the retention post engages the projection of the first member; arranging the second member so that the stop member abuts against an area of the second portion of the first member just below the bottom edge of the opening; and adding a base stop member to the second member to fixedly retain the connection member between the first member and the second member such that the base stop member is arranged on a first planar surface of the second member and bears against the first side of the base of the connection member and the second stop member is arranged on a second planar surface of the second member and bears against the first member just beneath the bottom edge of the opening.

BRIEF DESCRIPTION OF THE DRAWINGS

The disclosure will now be described, by way of example, with reference to the accompanying drawings, in which.

Like reference symbols in the various drawings indicate like elements.

DETAILED DESCRIPTION

The Figures illustrate an exemplary embodiment of a link in accordance with an embodiment of the invention. Based on the foregoing, it is to be generally understood that the nomenclature used herein is simply for convenience and the terms used to describe the invention should be given the broadest meaning by one of ordinary skill in the art.

Figure 1:
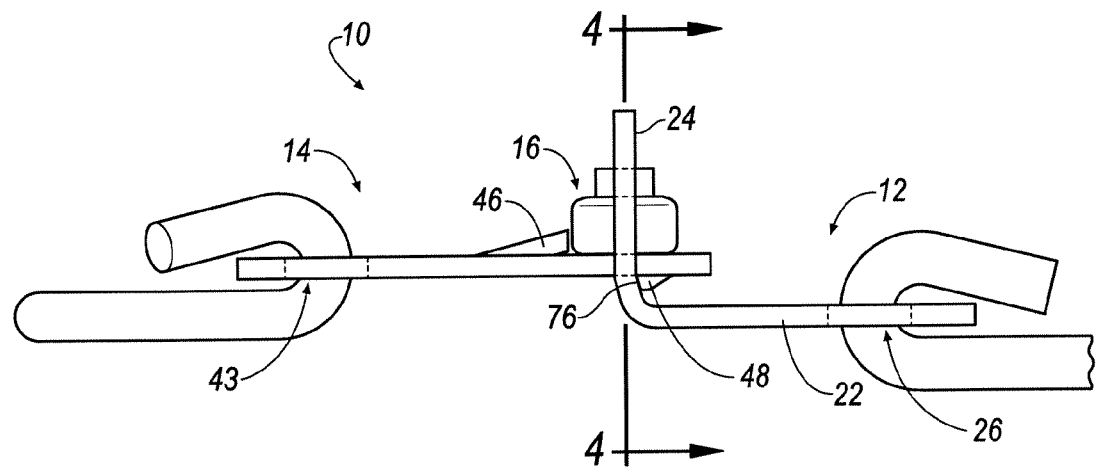
FIG. 1 is a side view of a fusible link, according to an implementation.

FIG. 1 is a side view of a link 10. In an example, link 10 includes a first member 12, a second member 14 and a connection member 16 disposed between first member 12 and second member 14. Connection member 16 selectively separates first member 12 and second member 14 based on a condition experienced by connection member 16.

In an implementation, first member 12 includes a first portion 22 and a second portion 24. Exemplarily, an axis of first portion 22 is generally orthogonal to an axis of second portion 24. Referring to FIG. 1 through FIG. 5, in an implementation, first portion 22 may define or provide an attachment feature 26 (e.g., an aperture or other means for connection) to facilitate placement of link 10 in an environment, which will be described hereinafter, and second portion 24 includes an attachment feature 30 for selectively connecting first member 12 to second member 14 and connection member 16. In an implementation, attachment feature 30 is an opening defined in second portion 24 and exemplarily includes opposing top and bottom edges 34, 36 connected by first and second edges 32, 38. As illustrated, top edge 34 has a generally centrally located, curvilinear projection 39 which forms a retainer and fulcrum 40.

In an implementation, second member 14 includes a first portion 42 and a second portion 44. As illustrated, first portion 42 may define or provide an attachment feature 43 (e.g., an aperture or other means for connection) to facilitate placement of link 10 in an environment and second portion 44 includes a first stop member 46 and a second stop member 48. First stop member 46 may be a deformation of a region of the second portion 44 which extends about a first side of a plane of second member 14 and second stop member 48 may be a deformation of a region of second portion 44 which extends about a second, opposing side of the plane of second member 14; the deformations may form a groove in the opposite surface. It is to be appreciated that other stop members may be used such that deformations and grooves may not occur as discussed. In an implementation; one or both of first stop member 46 and second stop member 48 may extend across the entire width of the second portion 44.

Figure 3:
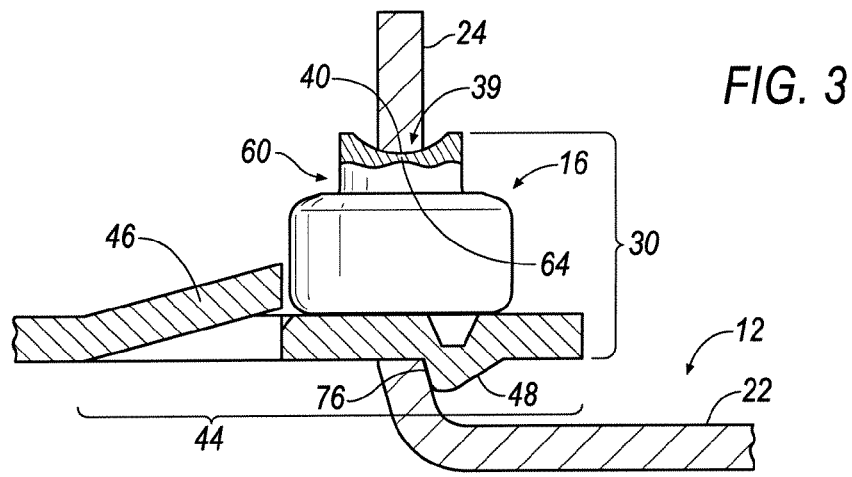
FIG. 3 is an enlarged, sectional side view of the fusible link shown in FIG. 2 taken along the line 3-3, according to an implementation.
Figure 4:
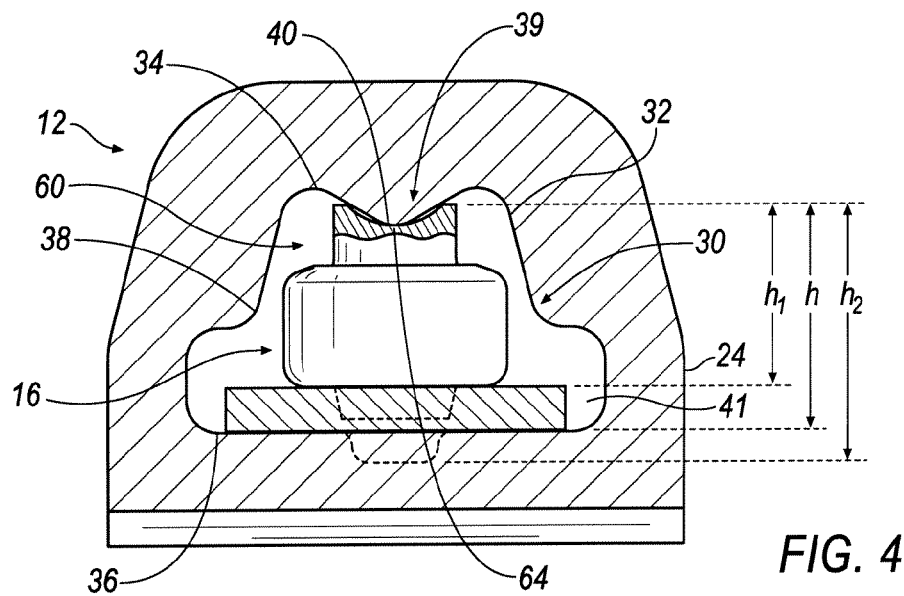
FIG. 4 is an enlarged, sectional view of the fusible link shown in FIG. 1 taken along the line 4-4, according to an implementation.
Figure 5:
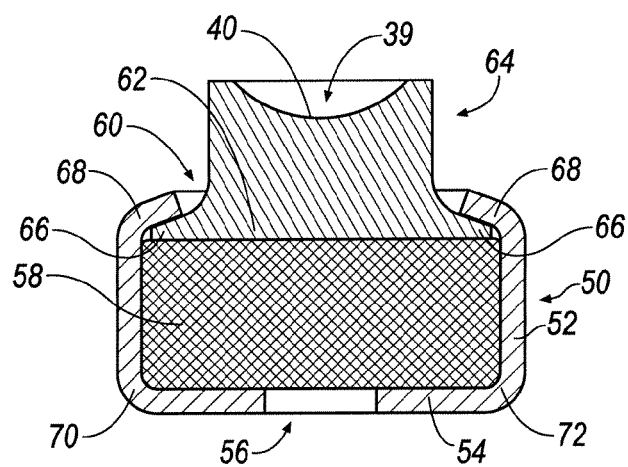
FIG. 5 is a side cross-sectional view of a connection member for a fusible link shown in FIG. 1 taken along the line 4-4, according to an implementation.

Referring now to FIG. 3 through FIG. 5, connection member 16 may include a hollow housing 50 having an annular sidewall 52 and a base 54. In an implementation, base 54 includes an opening 56 at a generally central region thereof, and a thermally responsive material 58 is disposed within housing 50. In an embodiment, thermally responsive material may be a wafer composed of a eutectic alloy that is solid at all temperatures below a threshold temperature and is formatted to generally change its phase, at least in part, when such threshold temperature is experienced by at least a portion of thermally responsive material.

In an implementation, connection member 16 further includes a retention post 60 having a first end 62 disposed within housing 50 and a second end 64 arranged in general proximity with retainer 39 and fulcrum 40. In an embodiment, first end 62 of retention post 60 may be flared 66 to correspond with a flange 68 defined by a free end of housing 50 at a position that generally opposes opening 56 such that first end 62 is sandwiched between flange 68 and thermally responsive material 58 when thermally responsive material is in a solid form. With continued references to the figures, second end 64 of retention post 60 includes a concave retainer recess for engagement with retainer and fulcrum 40. As depicted, connection member 16 is generally centrally located in opening 30 with its base 54 resting on second member 14 and its first side 70 situated next to first stop member 46. In an implementation, second stop member 48 bears on first member 12 just beneath bottom edge 36 of opening 30. Given the foregoing arrangement, when the link is assembled, first stop member 46 and second stop member 48 generally restrict lateral movement of connection member 16 with respect to first member 12 and second member 14 such that first member 12 and second member 14 may only be separated when thermally responsive material experiences a temperature at or greater then a threshold temperature.

A manufacturing process to assemble link 10 will now be described. In an embodiment, first member 12 and second member 14 are picked up by a shuttle car from a vibratory feeder and advanced to a main fixture block where they are co-located in a fixed position. Next, connection member 16 is picked up by a shuttle car from a vibratory feeder and advanced into opening 30 of first member 12 so that the axis of retention post 60 is generally parallel with the axis of second portion 24 of first member 12. The shuttle car then lowers connection member 16 so that second end 64 of retention post 60 engages projection 39 of first member 12. Second member 14 is then repositioned within the fixture block such that a portion of second portion 44 extends through opening 30 between base 54 of connection member 16 and bottom edge 36 of first member 12 so that second stop 48 abuts against an area of second portion 24 of first member 12, just below edge 36 of opening 30. Once properly located, first stop member 46 is added to second member 14 to fixedly retain connection member 16 between first member 12 and second member 14. First stop member 46 may be formed thereon via a crimping process or the like.

The distance between bottom edge 36 of opening 30 and a tip of the projection 39 is represented in FIG. 4 by the letter h. The distance between upper surface of second member 14 and the tip of projection 39 is represented by the letter $h_1$. The distance between the tip of the projection 39 and the free edge of second stop member 48 is represented by the letter $h_2$. For second stop member to clear bottom edge 36 of opening 30 and permit withdrawal of the second member 14 from opening 30, therefore, the second member 14 must be raised relative to the bottom edge 36 a distance at least as great as the difference between the dimensions h and $h_2$. This can occur, however, only if the length of the connection member 16 (including retention post 60) is shortened so as to be less than the dimension $h_1$.

Due to the nesting of the fulcrum 40 with the recess on second end 64 of post 60 it is generally difficult to push connection member 16 out of opening 30 in any direction. The construction of fulcrum 40 and the recess enables rocking of the connection member 16 about fulcrum 40, but since the first and second sides 70, 72 of base 54 of connection member 16 lies radially outwardly of fulcrum 40, rocking of connection member imposes a binding force between fulcrum 40 and second member 14 and transmitted by the connection member 16. Additionally, movement of second member 14 to the right with respect to first member 12 and connection member 16 is substantially prevented due to the location of first stop member 46. Thus, once the parts are assembled in the manner shown in FIG. 1 the only way in which the members 12 and 14 may be separated is by shortening connection member 16.

Figure 2:
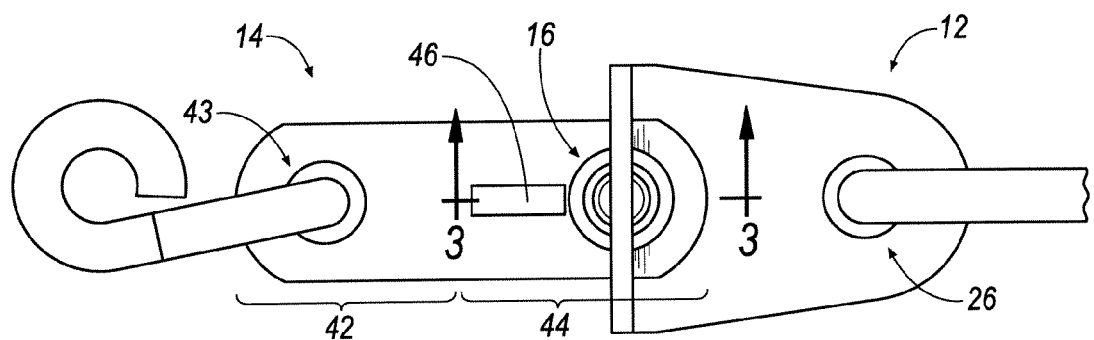
FIG. 2 is a top plan view of a fusible link, according to an implementation.

When the apparatus is assembled in the manner shown in FIGS. 1 and 2, the application of a tensile force to one or both of first member 12 and second member 14 will cause second stop member 48 to bear forcibly against second portion 24 of first member 12 just underneath bottom edge 36 of opening 30. And, as the confronting side 76 of second stop member 48 is inclined, the tensile force applied to first member 12 will cause second member 14 to move toward base 54 of connection member 16 and subject first member 12 to a compressive force between the fulcrum 40 and second member 14. Such force will be resisted by connection member 16.

The thermal responsive material 58 may have any one of a number of a threshold temperatures, i.e., a temperature at which the eutectic material changes from a solid to a liquid. For example, the eutectic alloy may have a critical temperature of 135.degree., 165.degree., 212.degree. F. or any other selected higher or lower temperature. When the eutectic wafer is subjected to its threshold or melting temperature, it liquefies and drains through opening 56 in base 54 of connection member 16. As this drains, tensile force applied on first and second members 12, 14 will cause the latter to move upwardly, as is permitted by surface 76, so as to shorten the length of connecting member 16. Eventually, the length of the connecting member 16 thus will be shortened by an amount sufficient to enable the second member 14 to move to a position in which second stop member 48 may clear the bottom edge 36 of opening 30, whereupon second member 14 becomes withdrawn from the opening 30 effecting separation of first member 12 from second member 14.

A number of implementations have been described. Nevertheless, it will be understood that various modifications may be made without departing from the spirit and scope of the disclosure. Accordingly, other implementations are within the scope of the following claims.

The invention claimed is:

1. A method for manufacturing a fusible link comprising:
providing a first member having a first portion and a second portion, the second portion having an attachment feature defining an opening with opposing top and bottom edges that are connected by first and second lateral edges;
providing a second member having a stop member;
providing a connection member having a retention post and a base with a first side and a second side,
co-locating the first member and the second member in a fixed position so that a portion of second member can be advanced through the opening of the first member;
placing the connection member into the opening of the first member so that an axis of the retention post is generally parallel with an axis of the second portion of the first member;

arranging the connection member so that the second end of the retention post engages the projection of the first member;

arranging the second member so that the stop member abuts against an area of the second portion of the first member just below the bottom edge of the opening;

adding a base stop member to the second member to fixedly retain the connection member between the first member and the second member such that the base stop member is arranged on a first planar surface of the second member and bears against the first side of the base of the connection member and the second stop member is arranged on a second planar surface of the second member and bears against the first member proximate the bottom edge of the opening.

2. The method according to claim 1, wherein the adding step comprises:

crimping the first stop member into the second member.

3. The method according to claim 1, wherein an axis of the first portion of the first member is generally orthogonal to an axis of the second portion of the first member.

4. The method according to claim 1, wherein the top edge has a generally centrally located, curvilinear projection which forms a retainer and fulcrum.

5. The method according to claim 1, wherein a first portion of the second member includes an attachment feature to facilitate placement of the fusible link in an environment.

6. The method according to claim 5, further comprising a connector extending through the attachment feature of the first portion of the second member.

7. The method according to claim 1, wherein the stop member is a deformation at a first region of a first planar surface of the second member.

8. The method according to claim 7, wherein the second member has a second stop member, and wherein the second stop member is a deformation at a second region of a second planar surface of the second member.

9. The method according to claim 8, wherein one or both of the deformations form a groove in the opposite planar surface.

10. The method according to claim 4, wherein the connection member defines a hollow housing having an annular sidewall extending from the base, and wherein the base includes an opening at a generally central region thereof, and further wherein a thermally responsive material is disposed within the hollow housing that is solid at all temperatures below a threshold temperature as experienced by at least a portion of thermally responsive material.

11. The method according to claim 10, wherein the retention post of the connection member has a first end disposed within the housing and a second end arranged in general proximity with the retainer and the fulcrum.

12. The method according to claim 11, wherein the first end of the retention post is flared to correspond with a flange defined by a free end of the housing at a position that generally opposes the opening such that the first end is sandwiched between the flange and the thermally responsive material when the thermally responsive material is in a solid form.

13. The method according to claim 12, wherein the second end of the retention post includes a concave retainer recess for engagement with the retainer and fulcrum.

14. The method according to claim 6, wherein the connector is a link.

15. The method according to claim 6, wherein the connector is a hook.

* * * * *